(12) United States Patent
Sen

(10) Patent No.: US 11,494,892 B2
(45) Date of Patent: Nov. 8, 2022

(54) SURFACE DEFECT DETECTION SYSTEM

(71) Applicant: ABB Schweiz AG, Baden (CH)

(72) Inventor: Nevroz Sen, San Jose, CA (US)

(73) Assignee: ABB Schweiz AG, Baden (CH)

( * ) Notice: Subject to any disclaimer, the term of this patent is extended or adjusted under 35 U.S.C. 154(b) by 131 days.

(21) Appl. No.: 16/999,361

(22) Filed: Aug. 21, 2020

(65) Prior Publication Data
US 2022/0058793 A1 Feb. 24, 2022

(51) Int. Cl.
G06T 7/00 (2017.01)
G06T 7/90 (2017.01)
G06V 10/25 (2022.01)
G06V 10/75 (2022.01)

(52) U.S. Cl.
CPC ............ *G06T 7/0008* (2013.01); *G06T 7/001* (2013.01); *G06T 7/90* (2017.01); *G06V 10/25* (2022.01); *G06V 10/751* (2022.01)

(58) Field of Classification Search
CPC ......... G06T 7/0008; G06T 7/001; G06T 7/90; G06V 10/25; G06V 10/751
See application file for complete search history.

(56) References Cited

U.S. PATENT DOCUMENTS

| | | | | |
|---|---|---|---|---|
| 4,975,972 A * | 12/1990 | Bose | ........................ | G06T 7/136 382/172 |
| 6,191,850 B1 * | 2/2001 | Chiang | .............. | G01N 21/8806 356/237.4 |
| 11,268,881 B2 * | 3/2022 | Finn | ........................ | G06T 7/001 |
| 2002/0088952 A1 * | 7/2002 | Rao | .................... | G01N 21/9501 250/559.45 |
| 2004/0149883 A1 | 8/2004 | Eda | | |
| 2005/0238237 A1 | 10/2005 | Haeusler et al. | | |
| 2006/0067652 A1 | 3/2006 | Cummings et al. | | |
| 2006/0245632 A1 | 11/2006 | Nisper et al. | | |
| 2007/0071308 A1 | 3/2007 | Nakatani | | |
| 2007/0211240 A1 | 9/2007 | Matsumoto et al. | | |
| 2008/0247630 A1 | 10/2008 | Horiuchi | | |
| 2008/0285840 A1 * | 11/2008 | Kawai | .................. | G01N 21/956 382/141 |
| 2010/0091272 A1 * | 4/2010 | Asada | .................... | G01N 21/55 356/237.2 |

(Continued)

FOREIGN PATENT DOCUMENTS

WO 2011144964 A1 11/2011
WO WO 2020/161534 A1 8/2020

OTHER PUBLICATIONS

Candes, Emmanuel J., et al., "Robust Principal Component Analysis?", Department of Statistics, Stanford University, et al., arXiv:0912.3599v1 [cs.IT] Dec. 18, 2009. 39pp.

(Continued)

Primary Examiner — Aaron W Carter
(74) Attorney, Agent, or Firm — Leydig, Voit & Mayer, Ltd.

(57) ABSTRACT

An inspection system is provided for detecting defects on surfaces. The system uses a pattern with varying color or darkness which faces the surface. A light illuminates the pattern on the surface so that the pattern and any defects on the surface are reflected and captured for image analysis. The processor then separates the pattern from the image in order to identify the locations of any defects on the surface.

17 Claims, 7 Drawing Sheets

(56) References Cited

U.S. PATENT DOCUMENTS

| | | | |
|---|---|---|---|
| 2011/0181873 A1 | 7/2011 | Yavets-Chen et al. | |
| 2011/0182496 A1 | 7/2011 | Sakai et al. | |
| 2012/0087566 A1* | 4/2012 | Mori | G06T 7/0004 |
| | | | 382/141 |
| 2013/0140457 A1 | 6/2013 | Minekawa et al. | |
| 2014/0307946 A1 | 10/2014 | Nakahira et al. | |
| 2015/0002653 A1 | 1/2015 | Hwang et al. | |
| 2015/0130927 A1* | 5/2015 | Luxen | G01B 11/303 |
| | | | 348/128 |
| 2016/0377416 A1 | 12/2016 | Reid et al. | |
| 2017/0309013 A1* | 10/2017 | Takayama | H04N 5/2256 |
| 2019/0096057 A1* | 3/2019 | Allen | G01N 21/89 |
| 2019/0272630 A1 | 9/2019 | Inazumi et al. | |
| 2019/0279388 A1 | 9/2019 | Kato | |
| 2019/0287237 A1* | 9/2019 | de Bonfim Gripp | G06V 10/82 |
| 2019/0339165 A1* | 11/2019 | Finn | F01D 5/005 |
| 2020/0088650 A1 | 3/2020 | Harada et al. | |
| 2022/0058793 A1* | 2/2022 | Sen | G06V 10/25 |

OTHER PUBLICATIONS

Armesto, Leopoldo, et al., "Inspection System Based on Artificial Vision for Paint Defects Detection on Cars Bodies", ICRA Communications, 2011 IEEE, 4pp.

Kamani, Parisa et al., "Car Body Paint Defect Inspection Using Rotation Invariant Measure of the Local Variance and One-Against-All Support Vector Machine", 2011 First International Conference on Informatics and Computational Intelligence, pp. 244-249, 6pp.

Tarry, Cole et al., "Robust detection of paint defects in moulded plastic parts", 2015 Canadian Conference on Computer and Robot Vision, pp. 306-312, 7pp.

Tandiya, Adarsh et al., "Automotive semi-specular surface defect detection system", 2018 15th Conference on Computer and Robot Vision, pp. 285-291, 7pp.

Tao, Xian et al., "Automatic Metallic Surface Defect Detection and Recognition with Convolutional Neural Networks", Appl. Sci. 2018, www.mdpi.com/journal/applsci, 15pp.

Akhtar, Sohail et al., "An Efficient Automotive Paint Defect Detection System", www.astesj.com, ASTES Journal ISSN: 2415-6698, pp. 171-182, 12pp.

CarPaintVision, Fully-automated inspection of painted surfaces, http:/www.isravision.com/en/automotive/applications/paint-shop-surface . . . , 2020, 3pp.

Cao et al., "A visual surface defect detection method based on low rank and sparse representation," *International J. of Innovative Computing, Information and Control*, (16)1: 45-61 (Feb. 2020).

Li et al., "Defect detection for patterned fabric images based on GHOG and low-rank decomposition," *IEEE Access*, 7: 83962-83973 (2019).

Huang et al., "Review of phase measuring deflectometry," *Optics and Lasers in Engineering*, 107 (2018): 247-257 (Aug. 2018).

European Patent Office, International Search Report in International Patent Application No. PCT/IB2021/057685, 4 pp. (dated Nov. 23, 2021).

European Patent Office, Written Opinion in International Patent Application No. PCT/IB2021/057685, 6 pp. (dated Nov. 23, 2021).

* cited by examiner

SURFACE DEFECT DETECTION SYSTEM

BACKGROUND

The present inventions relate generally to inspection systems, and more particularly, to identifying defects on a surface.

Detecting defects on a surface can be difficult and time-consuming. One example where defect detection is important and challenging relates to painted surfaces. When manufacturing products with painted surfaces, it is important to ensure that the painted surfaces are uniformly covered with paint without any anomalies in the paint coverage. However, using manual inspections can be unreliable and costly. Therefore, improved surface inspection systems would be desirable.

SUMMARY

An inspection system is described for detecting defects on a surface, such as anomalies in paint coverage. The system reflects a pattern off of the surface and separates the pattern from the reflected image to reveal any defects. A low-rank matrix and a sparse matrix may be used to separate the pattern from the defects. The locations of the defects on the surface may then be displayed for an operator to further evaluate the surface. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

One problem solved by the improved system herein is identifying and localizing defects 12 on a surface 10 which is reflected 24 from the painted surface 10 of the car bodies. Thus, uneven paint coverage or other paint coverage anomalies may be automatically identified and localized. The defect detection system may improve inspection speeds and lower inspection costs. Lower costs may be possible due to a reduced amount of data required to analyze images and reduced image acquisition requirements. It is also desirable with such a system to minimize false positives and provide acceptable accuracy in identifying actual defects.

In typical manufacturing facilities, surfaces of the manufactured products, such as the quality of car paints, is evaluated by experts. However, this can be a costly and labor-intensive process which may require multiple inspection lines in order to satisfy high volume production. The judgment that the expert makes about the quality of the surface is also subjective, and therefore, classifying results can be inconsistent. Due to developments in the area of machine learning algorithms for vision-based systems, it may be possible to develop automated defect detection solutions for the quality inspection of car paints or other surface quality inspections. A challenge of such a system includes the difficulty of acquiring decent quality of images, which typically cannot be achieved by standard cameras. For example, providing consistent acceptable lighting conditions is challenging because of the high reflection coefficient of painted surfaces. Therefore, acquisition of images is typically based on different principles in current solutions. One such technology is Phase Measuring Deflectometry (PMD) in which the topographical information of a specular surface is obtained by analyzing the reflections of a structured light source. This is done by first displaying a fringe pattern on an LCD screen which is located at a certain distance from the test surface and then capturing the reflected pattern with the help of a camera. In order to detect defects, existing algorithms require multiple images (e.g., up to 20 images) that are generated with certain phase shift patterns, which makes such systems costly and slow to use.

Figure 1:
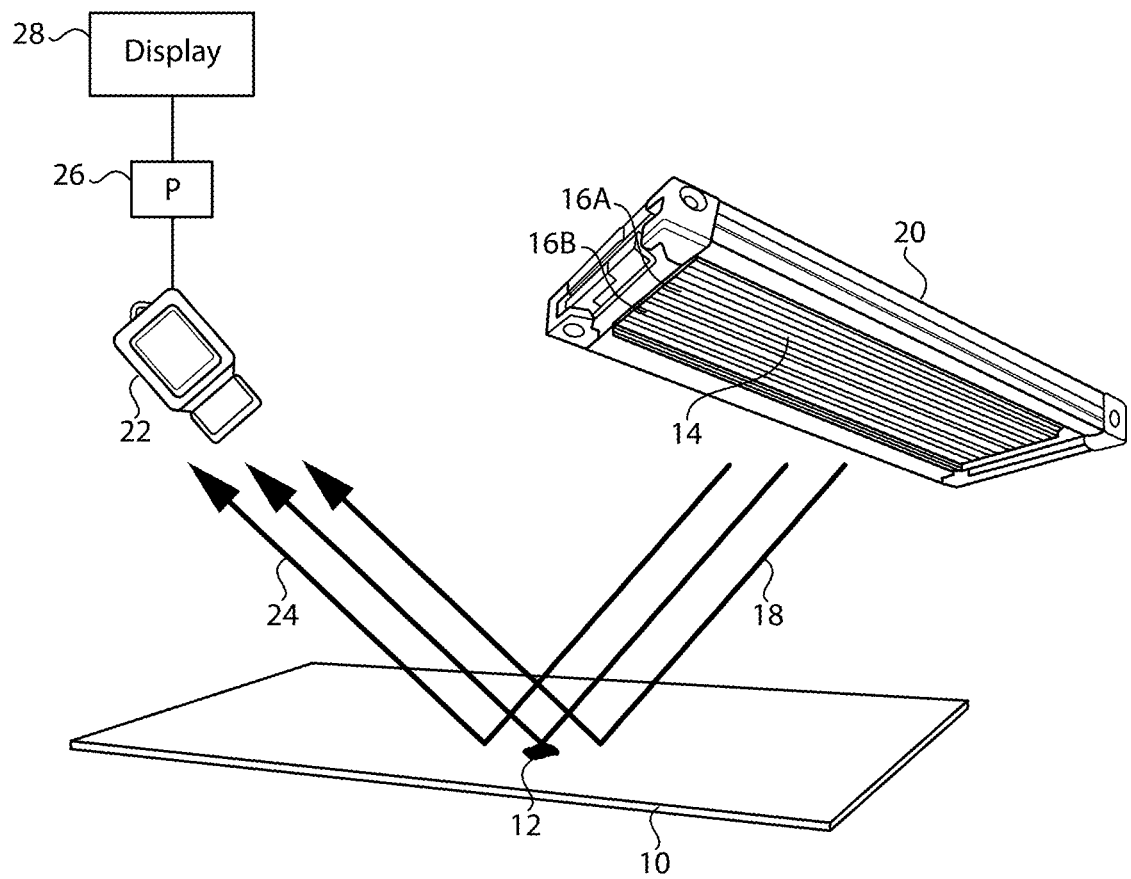
FIG. 1 is a schematic of a surface defect detection system.

In contrast to automated defect detection systems like PMD, the improved automated system herein may utilize as few as one image in order to identify defects on the surface. The improved system herein may also be used without needing to explicitly train the system since each sample may be analyzed independently. The basic structure of the automated system for detecting surface defects is shown in FIG. 1. As shown, a pattern 14 with regions 16A, B of varying color or darkness faces the surface 10 with a defect 12 thereon. A light source 18 illuminates the surface 10 so that the pattern 14 is reflected 24 by the surface 10. Although it is possible for the pattern 14 and the light source 18 to be separate from each other (e.g., a static placard and a lamp), it may be preferable for the pattern 14 and light source 18 to be emitted together from a single device like a display screen 20 (e.g., an LCD). The reflection 24 of the pattern 14 is then received by an image capture device 22, such as a camera. The received reflection 24 may then be automatically analyzed by a processor 26 as described further below to identify the defect 12 in the reflection 24 after separating the regions 16A, B of varying color or darkness from the reflection 24. After identifying the locations of any defects 12, the system may display the defect locations on an output device 28, such as another display screen.

Preferably, the pattern 14 has either vertical or horizontal line strips 16A, B of varying color or darkness that alternate with each other and extend across the pattern 14. The reflected image 24 therefore includes both the pattern 14 and any defects 12 in the surface 10, which are usually small in size. The improved defect detection system may use a low-rank and sparse matrix decomposition where the low-rank component represents the sinusoidal fringe patterns 14 and the sparse matrix includes the defects 12 as well as the surrounding noise. Statistical anomaly detection methods may then be used to identify the location of the defects 12 on the scanned surface 10.

Figure 2:
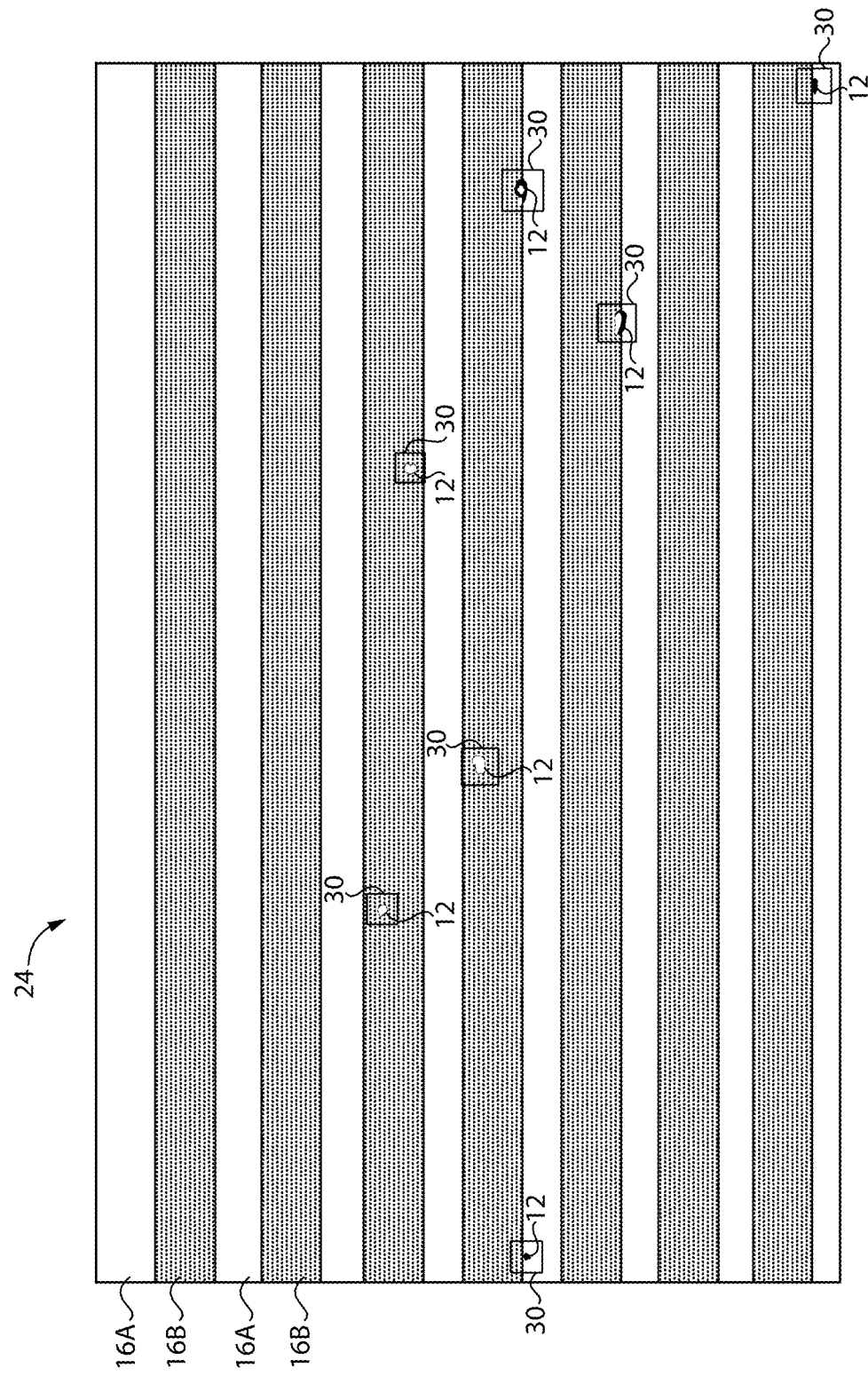
FIG. 2 is a reflected image from the surface defect detection system.

An example of a reflected image 24 with the pattern 14 and defects 12 (which are marked with boxes 30 for illustration purposes) is shown in FIG. 2. In this case the pattern 14 includes horizontal regions 16A, B of alternating light 16A and dark 16B regions. The image 24 is preferably analyzed as a matrix of pixels with each pixel having a value defined by the color or darkness thereof. In the case of FIG. 2, the relationship of $M \in R^{n_1 \times n_2}$ may denote the pixel values of the image 24. Since the image 24 is gray-scale, there is only one channel in this example. A particular feature of the matrix M, or any other reflection images generated with fringe patterns, is that the matrix has a low-rank component, i.e., the pattern 14, and a sparse component representing the anomalies 12. Hence, the original reflected image 24 may be represented by the relationship of $M=L_0+S_0$ where $L_0$ and $S_0$ denote the low-rank and sparse matrices, respectively. In other words, the values of the low-rank matrix and the values of the sparse matrix may be added together to arrive at the original reflected image 24 matrix. Preferably, the matrix values are pixel values (i.e., darkness value or color value of each pixel) such that, when corresponding pixel values in the two matrices are added together, the result is the pixel value of the corresponding pixel in the original reflected image 24.

The matrices relationship may be reduced to find matrices L and S that solves the following optimization problem:

$$\min \|L\|_* + \lambda \|S\|_1$$

$$\text{subject to } L+S=M. \quad (1)$$

In relationship (1), $\|\cdot\|_*$ denotes the nuclear norm which is defined as the sum of singular values of the matrix. For a non-square matrix A, $A^T$ may denote the transpose such that the square matrix $K := A^T A$. The singular values of A may then be defined as the square root of the eigenvalues of matrix K. Since the nuclear norm is a good convex lower approximation of the rank function, it may be used in optimization problems searching for low-rank matrices. In system herein, the nuclear norm helps to find the horizontal (or vertical) pattern 16A, B in the image 24. On the other hand, for a matrix $A \in \mathbb{R}^{n_1 \times n_2}$, $\|A\|_1 := \sum_i^{n_1} \sum_j^{n_2} |A_{ij}|$ denotes the $\ell_1$—norm of a matrix seen as a vector in $\mathbb{R}^{n_1 \times n_2}$ which in turn helps to identify the sparse component and hence the anomalies 12 in the reflected image 24. Thus, when optimizing the low-rank and sparse matrices, the processor 26 may minimize the nuclear norm of the low-rank matrix and may minimize the $\ell_1$-norm of the sparse matrix. In particular, it may be desirable to minimize a different characteristic (e.g., nuclear norm v. $\ell_1$-norm) of the first and second matrices when optimizing the matrices.

The formulation above may be referred to as Robust Principal Component Analysis (RPCA) which be solved via a tractable convex optimization problem. Under certain conditions, the matrices $L_0$ and $S_0$ may be recovered exactly. These conditions may be roughly stated that the low-rank matrix $L_0$ should not be sparse and the sparse matrix $S_0$ should not be low-rank. These conditions are described in more detail below.

Several generalizations and algorithms to effectively compute the sparse and low-rank matrices using RPCA may be used. One possible approach is Principal Component Pursuit by Alternating Directions in which the following augmented Lagrangian may be defined:

$$l(L, S, Y) = \|L\|_* + \lambda\|S\|_1 + \langle Y, M-L-S\rangle + \frac{\mu}{2}\|M-S-L\|_F^2, \quad (2)$$

where $\|\cdot\|_F$ denotes a Frobenius norm. For the low-rank and sparse decomposition problem, alternating steps may involve solving $$\min_L l(L, S, Y) \text{ and } \min_S l(L, S, Y)$$

which have closed form solutions. More explicitly, $S_\tau : \mathbb{R} \to \mathbb{R}$ may be defined as $S_\tau(x) = \text{sign}(x)\max(|x|-\tau, 0)$ which may be extended to matrices by applying it to each element. It then follows that:

$$\text{argmin}_S l(L,S,Y) = S_{\mu\lambda}(M-L-\mu^{-1}Y) \quad (3)$$

$$\text{argmin}_L l(L,S,Y) = D_\mu(M-S-\mu^{-1}Y) \quad (4)$$

where $D_\mu(X)$ denotes the singular value thresholding operator given by $D_\tau(X) = US_\tau(\Sigma)V^*$ where $X=U\Sigma V^*$ is any singular value decomposition. Thus, the algorithm may first minimize l with respect to L (fixing S) then minimize l with respect to S (fixing L), and then finally update the Lagrange multiplier matrix Y based on the residual M−L−S. The strategy may be summarized as follows:

---

Algorithm 1: Principal Component Pursuit

Result: S, L
$S_0 = Y_0 = 0$, $\mu > 0$;
while While not converged do
   | compute $L_{k+1} = D_\mu(M - S_k - \mu^{-1}Y)$;
   | compute $S_{k+1} = S_{\lambda\mu}(M - L_{k+1} - \mu^{-1}Y)$;
   | compute $Y_{k+1} = Y_k + \mu(M - L_{k+1} - S_{k+1})$
end

--- where the convergence criteria can be set by $|M-L-S|_F \leq \delta \|M\|_F$ with $\delta = 10^{-7}$.

Figure 3:
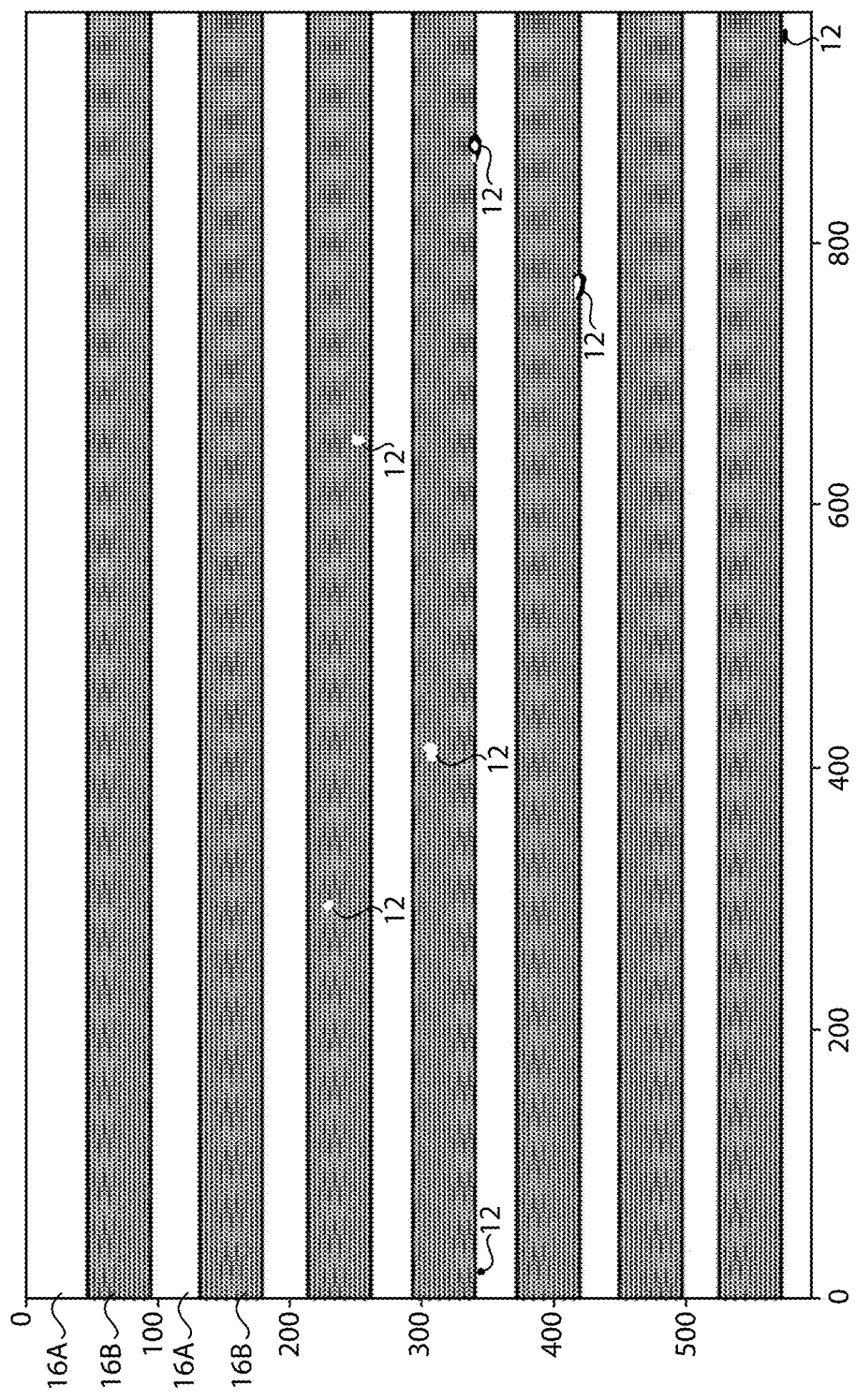
FIG. 3 is the image of FIG. 2 after applying a noise filter to the image.
Figure 4:
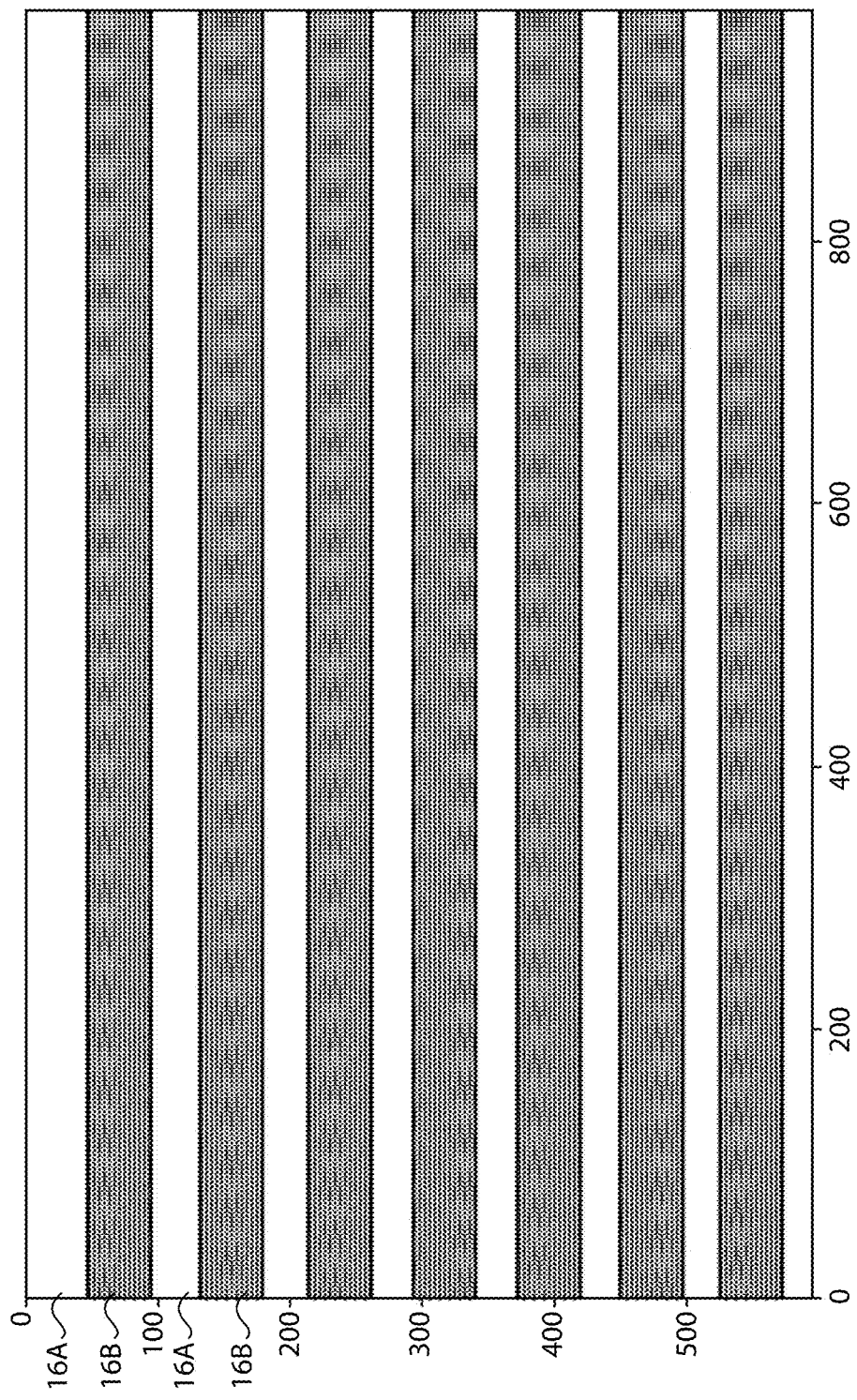
FIG. 4 is a low-rank matrix of the image of FIG. 3.
Figure 5:
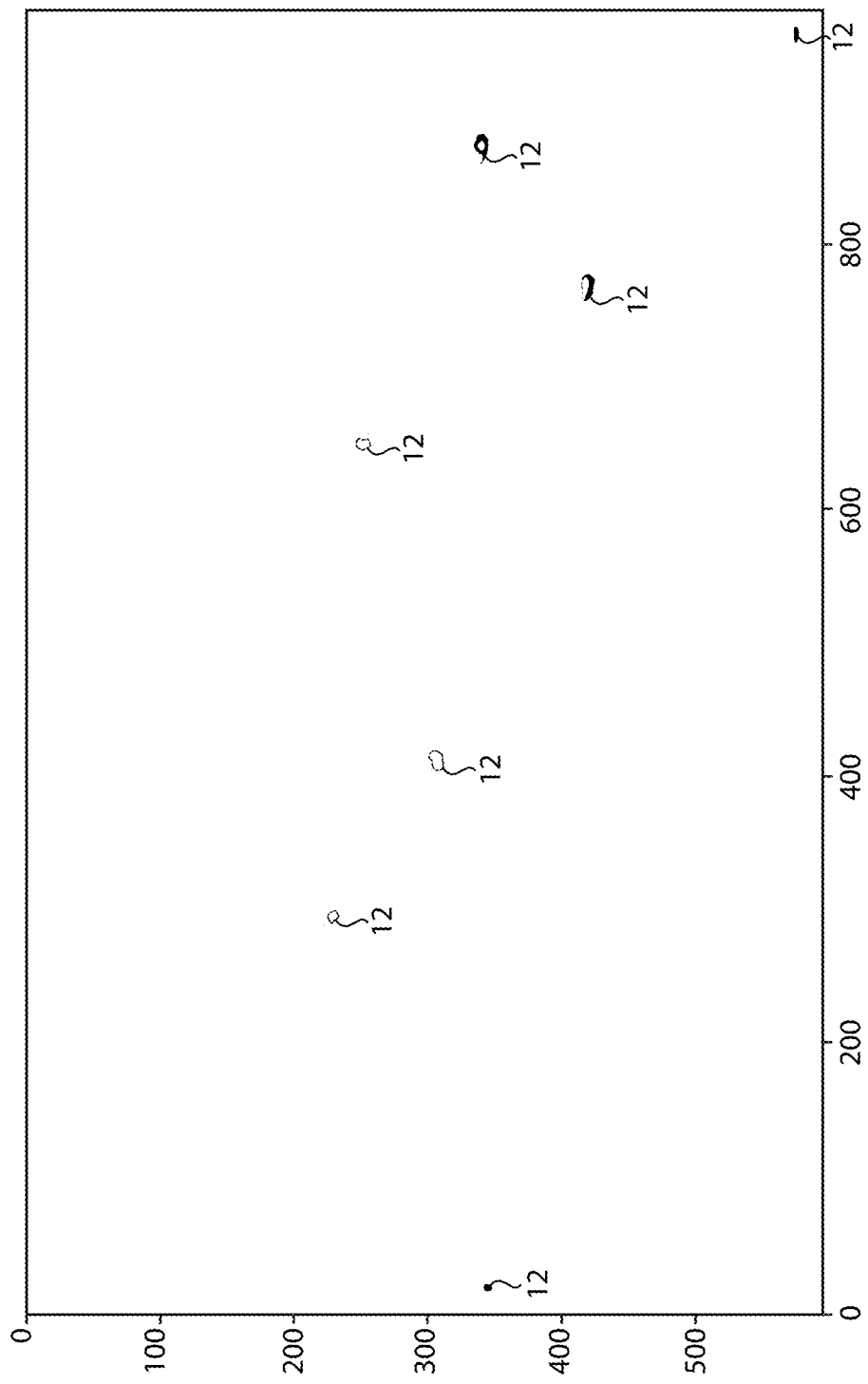
FIG. 5 is a sparse matrix of the image of FIG. 3.

Images acquired with reflected patterns are typically imperfect and might include undesirable effects from the surrounding, such as lightning, noise and similar. Therefore, it may be preferable to apply a denoising filter to the reflected image 24 before separating the pattern 14 from the reflected image 24 using the low-rank and sparse matrices. A simple denoising method may be used based on simple averaging where the value of a pixel may be replaced with an average of similar pixels where the similar pixels are not necessarily pixels that are close to the particular pixel. This method, referred to as non-local means denoising, may be helpful to suppress noise while keeping the defect information more visible. Applying such a filter to FIG. 2 may result in the image in FIG. 3. Therefore, the first two steps of the method performed by the processor 26 may include applying a non-local means denoising filter and low-rank sparse decomposition to the filtered image. FIG. 4 illustrates the low-rank matrix with the pattern 14 and without the defects 12, and FIG. 5 illustrates the sparse matrix with the defects 12 and without the pattern 14.

In order for the low-rank sparse decomposition to completely hold true, the sparse component should not include low-rank components. However, in surfaces 10 with defects 12 this condition may not always hold, and therefore, it may be possible for a certain noise component and some information from the background, i.e., the pattern 12 to leak through to the sparse matrix. Therefore, it is undesirable to apply a simple thresholding decision rule to identify defects. Instead, statistical properties of the sparse matrix may be used by the processor 26 to identify the locations of defects 12. In this regard, each column of the sparse matrix may be treated as a sample, and hence, for the sample under consideration the columns may be defined as $n_2=976$. The sample mean may be defined as $$\mu = \frac{1}{n_2}\sum_{i=1}^{n_2} S[:,i].$$

Figure 6:
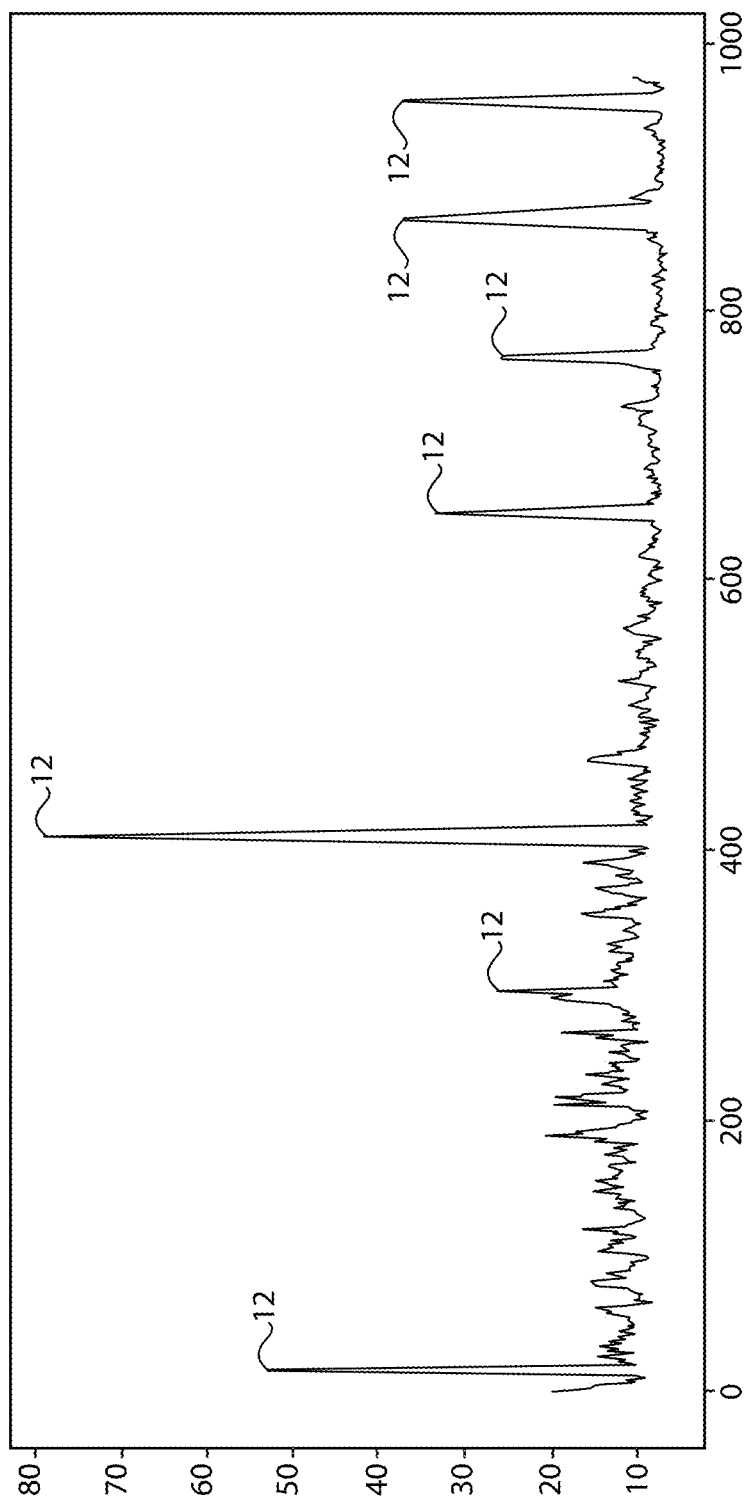
FIG. 6 is a statistical analysis of the image of FIG. 5 showing the locations of defects in the image.
Figure 7:
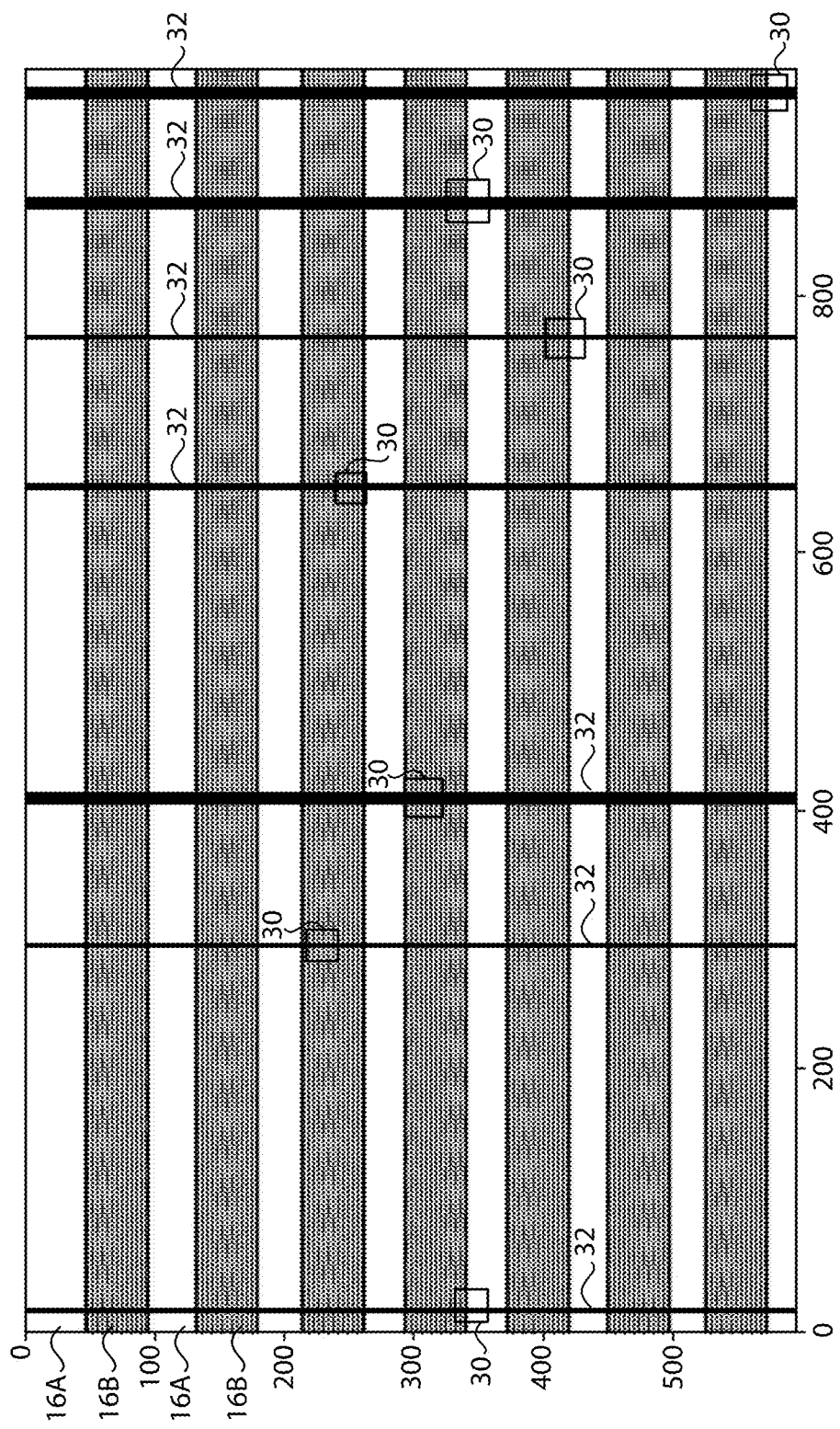
FIG. 7 is a display output of the reflected image showing the locations of defects in the reflected image.

Next, the distance of each sample may be defined as $d_i = \sqrt{(S[:,i]-\mu)(S[:,i]-\mu)^T}$ for $i=1, \ldots, n_2$. That is, the values of portions (e.g., pixel values) of each column are compared with each other to identify the portions in the column that have distinctly different values from the other portions in the column. In the preferred embodiment, the regions used for defect analysis extend across the reflected image 24 and may be a line of pixels with the pixels in each line being compared with the other pixels in the line. Preferably, the regions used for defect analysis are oriented transversely to the alternating regions of the pattern. For example, in the present example, the pattern regions 16A, B are oriented horizontally whereas the defect analysis regions are oriented vertically (i.e., columnar). In this way, if a fraction of the pattern leaks into the sparse matrix, the remaining fraction of the pattern 14 may be screened out during defect analysis due to the transverse orientation of the defect analysis regions. FIG. 6 demonstrates the distance of each column vector, and as shown the error is significant at the defect 12 locations. If Chebyshev's inequality for 3σ (3 standard deviations) is applied and the errors are identified where there are deviations from the rest of the samples, the columns 32 illustrated in FIG. 7 may be displayed on the output display screen 28 to display the locations of the defects 12. It is also possible to use other anomaly detection techniques to detect the defects 12, such as Local Outlier Factor (LOF) which compares the deviation of each sample with respect to its neighbors. It is noted that the display output of the columns 32 only indicates the locations of the defects 12 along the axis corresponding the defect analysis regions (in this case columns). If it is desired to identify the locations of the defects 12 along both the x and y axes, further analysis would be needed which may not be necessary or desirable in all cases. However, if desired, such further location identification could be accomplished by rotating the pattern 14 and the data analysis and repeating the above process.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A system for detecting surface defects, comprising:
   a surface with a defect thereon;
   a pattern facing the surface with regions of varying color or darkness;
   a light source illuminating the surface;
   an image capturing device receiving a reflection of the pattern from the surface;
   a processor configured to identify the defect in the reflection after separating the regions of varying color or darkness from the reflection, by:
      separating the reflection into a first matrix including the regions of varying color or darkness and a second matrix including the defect;
      optimizing the first matrix and the second matrix, wherein the first matrix comprises a low-rank matrix and the second matrix comprises a sparse matrix; and
   an output device displaying a location of the defect on the surface.

2. The system according to claim 1, wherein the pattern comprises alternating regions of the varying color or darkness extending across the pattern.

3. The system according to claim 2, wherein the processor is configured to: divide the reflection into a plurality of regions with each region extending across the reflection, and compare portions within each region with each other to identify the defect in one of the regions after separating the alternating regions of varying color or darkness from the reflection.

4. The system according to claim 3, wherein the plurality of regions are oriented transversely to the alternating regions, the plurality of regions thereby screening out any remaining fraction of the alternating regions which passes through the separation of the alternating regions from the reflection.

5. The system according to claim 1, wherein the processor is configured to: divide the reflection into a plurality of regions with each region extending across the reflection, and compare portions within each region with each other to identify the defect in one of the regions after separating the regions of varying color or darkness from the reflection.

6. The system according to claim 5, wherein the location of the defect is displayed by the output device along an axis corresponding to the plurality of regions.

7. The system according to claim 5, wherein each of the regions comprise a line of pixels and the portions comprise pixels within each line.

8. The system according to claim 1, wherein the first matrix and the second matrix each define values that when added together comprise a representation of the reflection.

9. The system according to claim 8, wherein the values of the first matrix and the second matrix are values for corresponding pixels in the first matrix and the second matrix.

10. The system according to claim 1, wherein the processor is configured to minimize a nuclear norm of the low-rank matrix.

11. The system according to claim 1, wherein the processor is configured to minimize a $l_1$-norm of the sparse matrix.

12. The system according to claim 1, wherein the processor is configured to minimize a first characteristic of the low-rank matrix and a second characteristic of the sparse matrix, the first and second characteristics being different from each other.

13. The system according to claim 12, wherein the first characteristic comprises a nuclear norm and the second characteristic comprises a $l_1$-norm.

14. A system for detecting surface defects, comprising:
   a surface with a defect thereon;
   a pattern facing the surface with regions of varying color or darkness;
   a light source illuminating the surface;
   an image capturing device receiving a reflection of the pattern from the surface;
   a processor configured to identify the defect in the reflection after separating the regions of varying color or darkness from the reflection, by:
      separating the reflection into a first matrix including the regions of varying color or darkness and a second matrix including the defect; and
      optimizing the first matrix and the second matrix, wherein the processor is configured to minimize a first characteristic of the first matrix and a second characteristic of the second matrix, the first and second characteristics being different from each other; and an output device displaying a location of the defect on the surface.

15. The system according to claim 1, wherein the processor is configured to filter noise from the reflection before separating the regions of varying color or darkness from the reflection.

16. The system according to claim 1, wherein the pattern and the light source are emitted from a display screen.

17. The system according to claim 4, wherein the surface is painted and the defect is an anomaly in coverage of the paint.

* * * * *